US010615436B2

(12) United States Patent
Cader et al.

(10) Patent No.: US 10,615,436 B2
(45) Date of Patent: Apr. 7, 2020

(54) FUEL CELL TO POWER ELECTRONIC COMPONENTS

(71) Applicant: Hewlett Packard Enterprise Development LP, Houston, TX (US)

(72) Inventors: Tahir Cader, Liberty Lake, WA (US); Hai Ngoc Nguyen, Spring, TX (US); Javier F. Izquierdo, Houston, TX (US); Ameya Soparkar, Hagerstown, MD (US); Mark Joseph Lepore, Fort Collins, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 92 days.

(21) Appl. No.: 15/569,234

(22) PCT Filed: Dec. 22, 2015

(86) PCT No.: PCT/US2015/067523
§ 371 (c)(1),
(2) Date: Oct. 25, 2017

(87) PCT Pub. No.: WO2017/111969
PCT Pub. Date: Jun. 29, 2017

(65) Prior Publication Data
US 2018/0316030 A1 Nov. 1, 2018

(51) Int. Cl.
| H01M 8/04701 | (2016.01) |
| H01M 8/0656 | (2016.01) |
| H01M 8/04029 | (2016.01) |
| C25B 15/02 | (2006.01) |
| C25B 1/04 | (2006.01) |
| H01M 8/0432 | (2016.01) |

(52) U.S. Cl.
CPC ........... *H01M 8/04738* (2013.01); *C25B 1/04* (2013.01); *C25B 15/02* (2013.01); *H01M 8/04029* (2013.01); *H01M 8/04373* (2013.01); *H01M 8/0656* (2013.01); *Y02E 60/366* (2013.01); *Y02P 20/129* (2015.11); *Y02P 20/133* (2015.11)

(58) Field of Classification Search
CPC ......... H01M 8/04738; H01M 8/04029; H01M 8/04373; H01M 8/0656; C25B 1/04; C25B 15/02; Y02P 20/129; Y02P 20/133; Y02P 60/366
See application file for complete search history.

(56) References Cited

U.S. PATENT DOCUMENTS

| 6,370,903 | B1 | 4/2002 | Welch |
| 8,522,569 | B2 | 9/2013 | Avery |
| 8,586,257 | B2 | 11/2013 | Nitta |

(Continued)

FOREIGN PATENT DOCUMENTS

CN   100565996 C   12/2009

OTHER PUBLICATIONS

Extended European Search Report, EP Application No. 15911647.4, dated Sep. 20, 2018, pp. 1-8, EPO.

(Continued)

*Primary Examiner* — Stewart A Fraser

(57) ABSTRACT

An example system is provided herein. The system includes a fuel cell coupled to the set of electronic components. The fuel cell provides power to the set of electronic components when a set of conditions are met.

17 Claims, 12 Drawing Sheets

(56) References Cited

U.S. PATENT DOCUMENTS

| | | |
|---|---|---|
| 8,937,405 B2 | 1/2015 | Park |
| 2004/0191595 A1* | 9/2004 | McElroy .......... H01M 8/04014 429/418 |
| 2005/0014040 A1 | 1/2005 | Kaye |
| 2005/0058867 A1 | 3/2005 | Rocke et al. |
| 2005/0198963 A1 | 9/2005 | Wai et al. |
| 2005/0244241 A1 | 11/2005 | Miyazaki et al. |
| 2009/0048716 A1 | 2/2009 | Marhoefer |
| 2011/0008696 A1* | 1/2011 | Ballantine ......... H01M 8/04208 429/431 |
| 2011/0096503 A1 | 4/2011 | Avery et al. |
| 2011/0129745 A1 | 6/2011 | Givens et al. |
| 2012/0122002 A1 | 5/2012 | Kamat |
| 2013/0163192 A1 | 6/2013 | Ballantine et al. |

OTHER PUBLICATIONS

International Search Report and Written Opinion, International Application No. PCT/US2015/067523, dated Sep. 12, 2016, pp. 1-12, KIPO.

Guizzi, G. L., et al; "Fuel cell-based cogeneration system covering data centers' energy needs", May 2012, 3 pps.

Curtin et al., "The Business Case for Fuel Cells 2013. Reliability, Resiliency and Savings", Fuel Cells 2000, 2013, 36 pages.

Daniel Bizo, "Hydrogen-powered branch IT: CommScope brings fuel cells to your rack", 451 Group, Nov. 25, 2014, 4 pages.

Whitney et al., "Hyperscale fuel cell deployments spark datacenter suppliers' efforts", 451 Group, Jan. 30, 2015, 4 pages.

\* cited by examiner

FUEL CELL TO POWER ELECTRONIC COMPONENTS

BACKGROUND

Electronic devices have power and temperature requirements. Power for the electronic devices may be provided from available resources. The power needed includes resources to power electronic devices and provide power to systems that control the temperature of the electronic devices.

BRIEF DESCRIPTION OF THE DRAWINGS

Non-limiting examples of the present disclosure are described in the following description, read with reference to the figures attached hereto and do not limit the scope of the claims. In the figures, identical and similar structures, elements or parts thereof that appear in more than one figure are generally labeled with the same or similar references in the figures in which they appear. Dimensions of components and features illustrated in the figures are chosen primarily for convenience and clarity of presentation and are not necessarily to scale. Referring to the attached figures:

DETAILED DESCRIPTION

Figure 1:
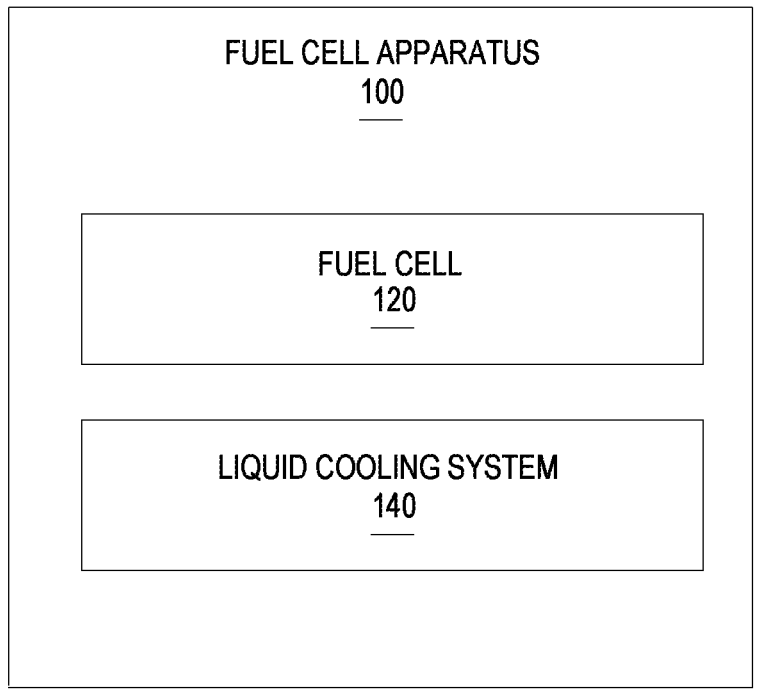
FIGS. 1-2 illustrate block diagrams of fuel cell apparatuses to provide power to a set of electronic components according to examples.

In the following detailed description, reference is made to the accompanying drawings which form a part hereof, and in which is depicted by way of illustration specific examples in which the present disclosure may be practiced. It is to be understood that other examples may be utilized and structural or logical changes may be made without departing from the scope of the present disclosure.

Electronic system designs balance conflicts between power density, spatial layout, temperature requirements, acoustic noise, and other factors on the electronic devices. Reduction of power consumption and carbon footprints are increasingly important. Heating and cooling of electronic components may be controlled using heating and cooling systems incorporated into the electronic device and environment surrounding the electronic devices. Examples of heating and cooling systems include air and liquid heating and cooling components.

As the demand for computing power continues to expand rapidly, data centers are expanding, but struggling to keep up with the demand. The increasing demand for large power capacity upgrades is stressing the ability of utilities to sufficiently support the power capacities. In many cases, data centers need to wait three or more years for a major power upgrade. Furthermore, the increasing dependence of data centers on the electric grid is impacting their reliability and uptime. Finally, reliance on the electric grid is increasing the carbon footprint of data centers, unless they are willing to pay for higher-priced renewable energy.

Data centers are now squarely in the cross-hairs of organizations like Greenpeace, and this is an uncomfortable place for them to be. An alternative for next generation data centers may include the use of fuel cells to provide the base load for electronic components in the data center. For example, automotive industry fuel cells may be utilized as a cost effective alternative to scale power delivery systems for data centers in a manner that is much more closely matched with their demand. Automotive fuel cells may also provide the benefit of reduced cost due to the high volume manufacturing capabilities of the automotive industry. Moreover, the use of fuel cells may prevent a multi-year wait for significant power capacity upgrades, and may allow the data center to scale capacity closely with customer demand. The use of fuel cells in turn may reduce the total reliance on the electric grid, improve reliability and uptime of data centers, and reduce the carbon footprints of the data centers, which are all top priorities. Finally, the waste heat captured from the liquid-cooled fuel cells coupled with liquid-cooled electronic components may be used to drive an adsorption chiller to make chilled water, with the remainder of the waste heat going for other uses such as heating buildings and/or pre-heating water for lab use.

In examples, allocation of energy sources in a data center is provided. The allocation is distributed between a first energy source and a fuel cell coupled to the set of electronic components to provide power to the set of electronic components.

Figure 2:
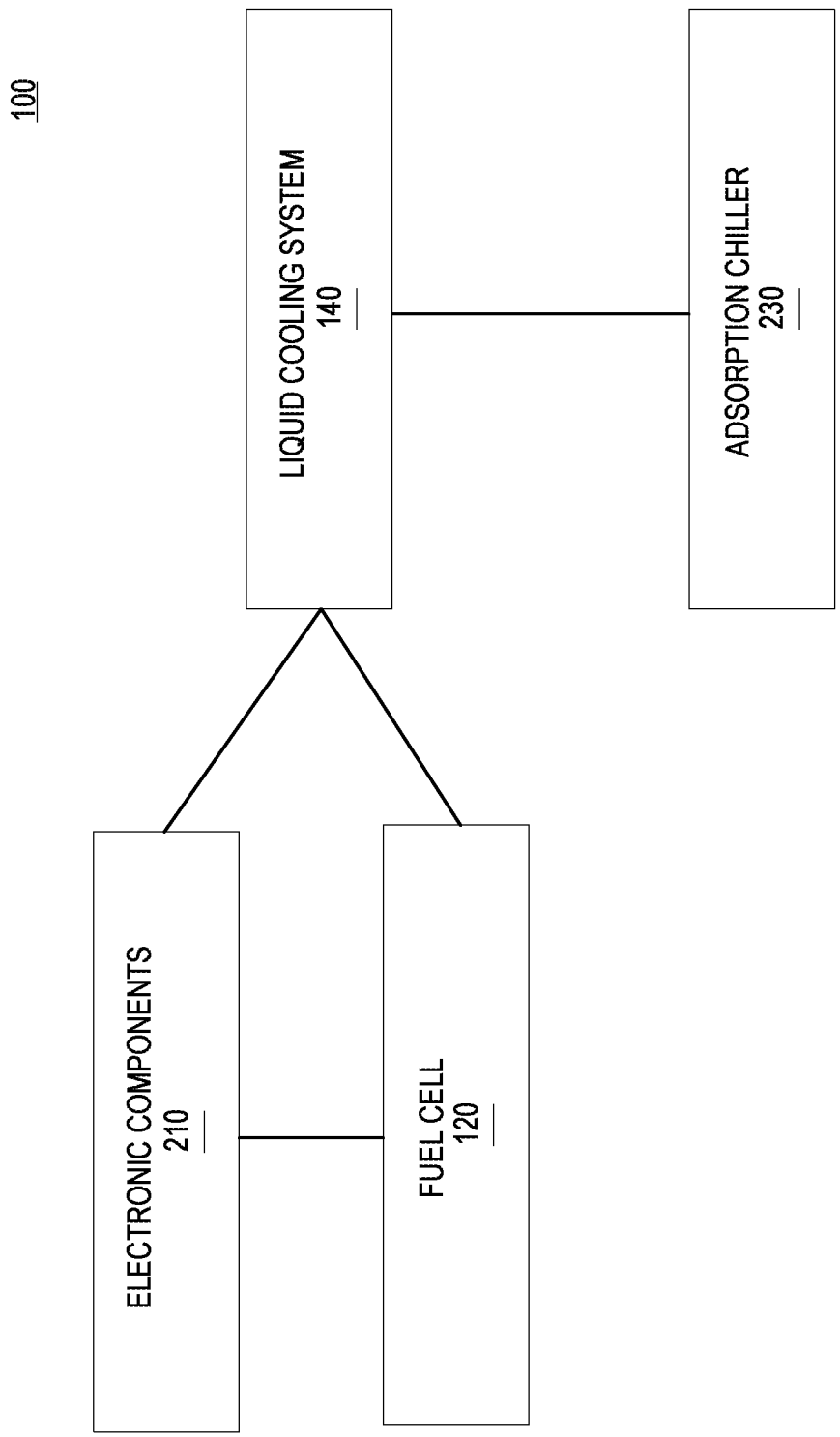

FIGS. 1-2 illustrate block diagrams of fuel cell apparatuses to provide power to a set of electronic components according to examples. Fuel cell apparatus 100 to manage a set of electronic components in a data center as illustrated in FIG. 1, includes fuel cell 120 and liquid cooling system 140. Referring to FIGS. 1-2, the fuel cell 120 is coupled to the set of electronic components 210 to provide power to the set of electronic components 210. The set of electronic components 210 may include data center computing devices and electronic devices, such as servers, network devices, storage devices, control units, cooling units, and power units. The liquid cooling system 140 to remove heat from the set of electronic components and the fuel cell 120. The liquid cooling system 140 to coordinate the flow of liquid across the fuel cell 120 and the set of electronic components 210.

The liquid cooling system 140 may be connected to an adsorption chiller 230 to convert waste heat into chilled water. The liquid-cooled fuel cells and liquid-cooled electronic components can be closely coupled in a cooling loop, with the waste heat going to drive an adsorption chiller 230. The adsorption chiller 230 may use part of the waste heat to create for example, 9° C. chilled water, while the remainder of the waste heat may be used to heat buildings or pre-heat water for lab use to name a few examples. A simple payback analysis, using conservative assumptions, suggests that a next generation data center that deploys fuel cells, liquid-cooled electronic components, and uses adsorption chillers 230 may not only address the current demands of data centers but could also achieve a return on the investment in under 5 years.

Figure 3:
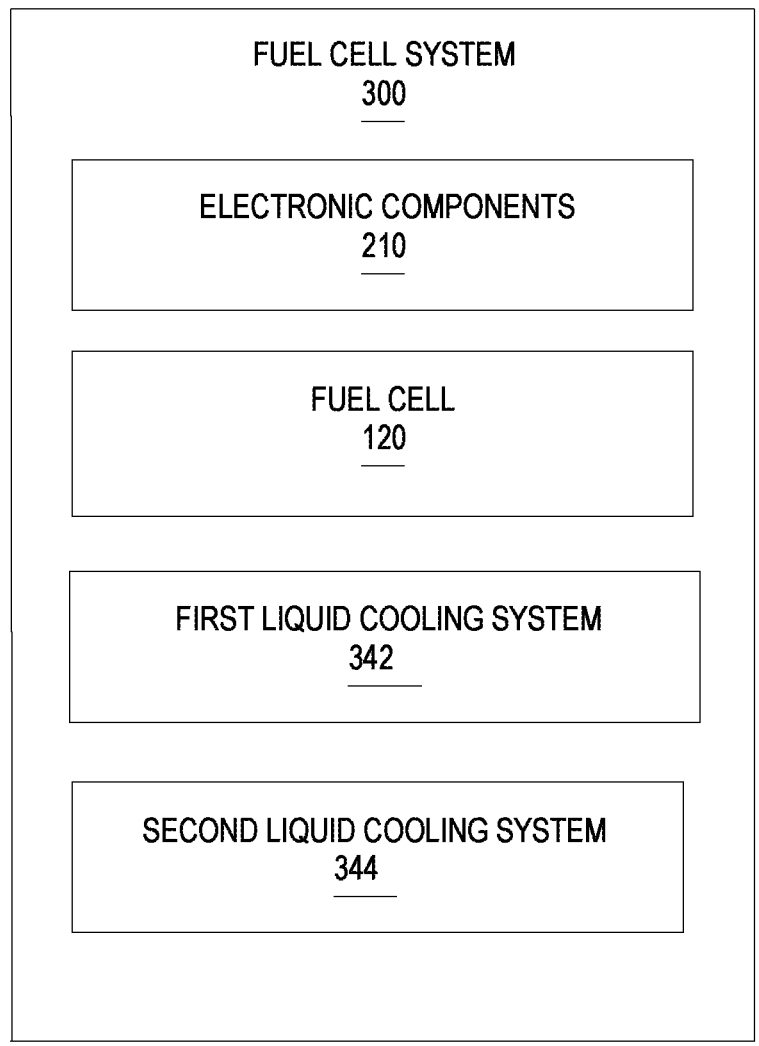
FIG. 3 illustrates a block diagram of a fuel cell system to manage power and thermal components in a data center according to an example.

FIG. 3 illustrates a block diagram of a fuel cell system 300 to manage power and thermal components in a data center according to an example. The fuel cell system 300 includes a set of electronic components 210, a fuel cell 120, a first liquid cooling system 342, and a second liquid cooling system 344. The fuel cell 120 is connected to the set of electronic components 210 to provide power to the set of electronic components 210. The first liquid cooling system 342 to remove heat from the set of electronic components 210. The second liquid cooling system 344 to remove heat from the fuel cell 120. The first liquid cooling system 342 and the second liquid cooling system 344 coupled to a data center cooling infrastructure 446 that coordinates the flow of fluid between the first and the second liquid cooling systems 342, 344 to form a single cooling loop, as further illustrated in FIG. 6.

Figure 4:
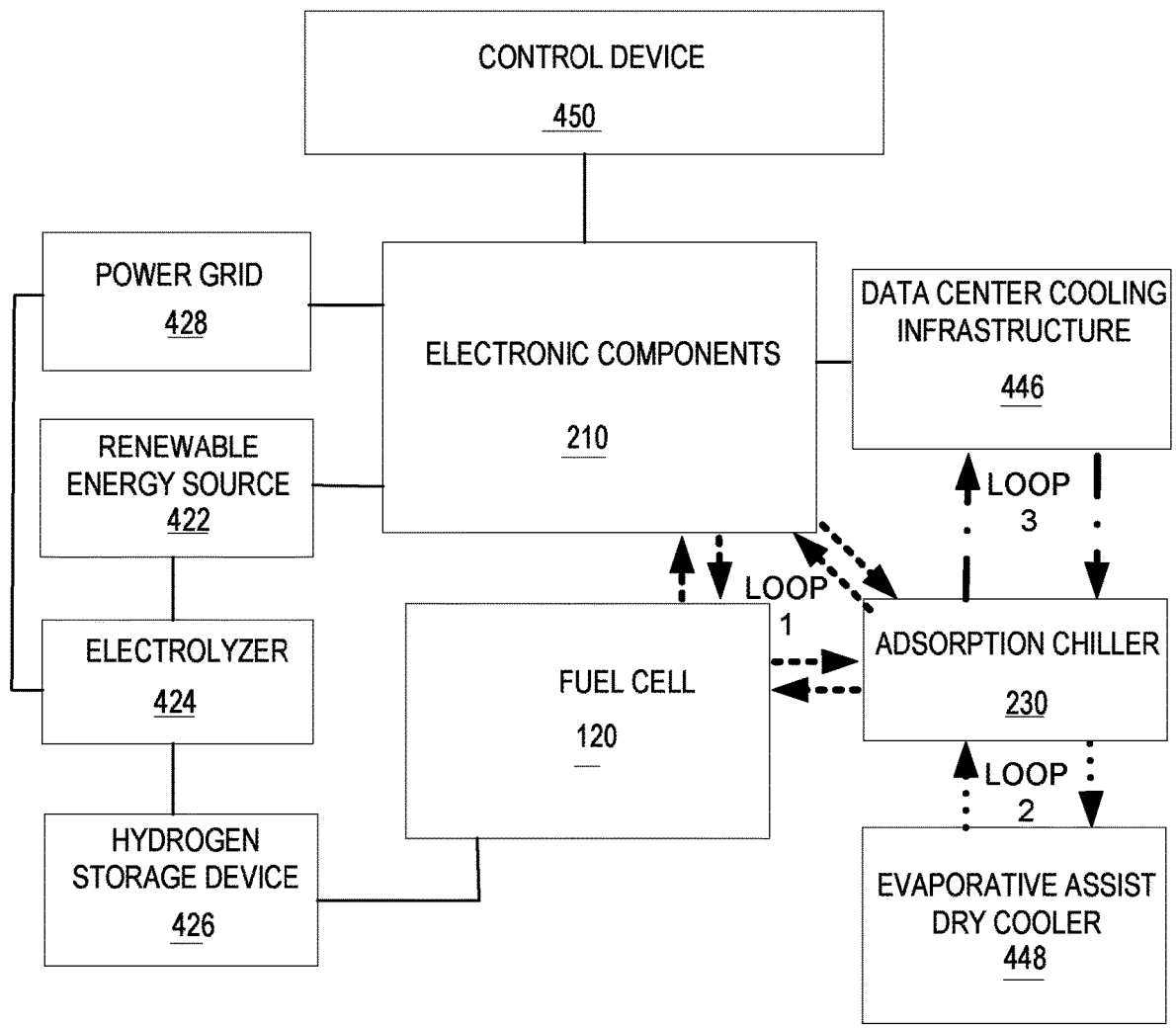
FIGS. 4-6 illustrate schematic diagrams of the system of FIG. 3 according to examples.
Figure 5:
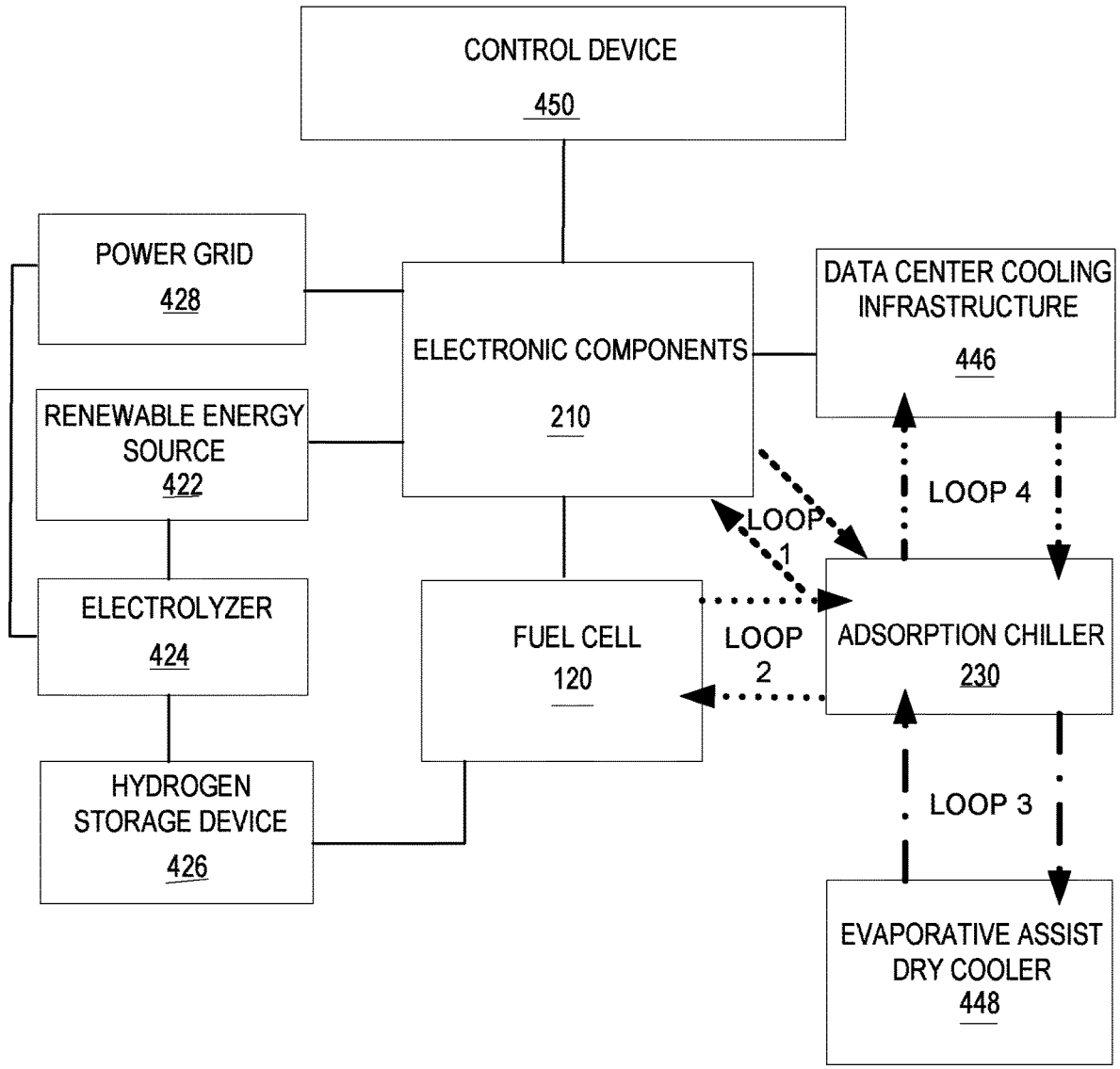
Figure 6:
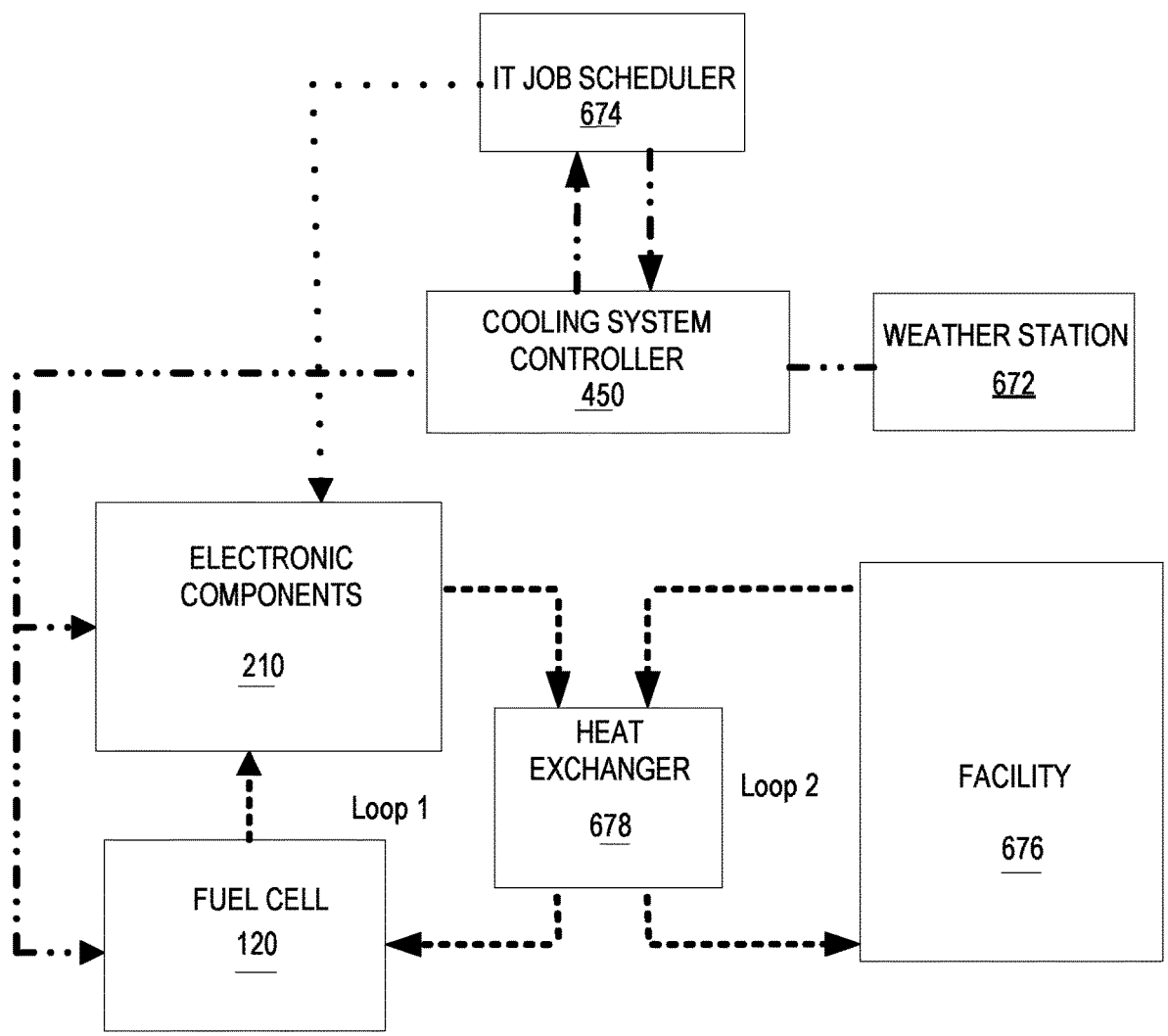

FIGS. 4-6 illustrate schematic diagrams of the system of FIG. 3 according to examples. The fuel cells 120 may be used in the data center in conjunction with the renewable energy source 422 to provide continuous power to the data center. The system may also supplement power supplied through the power grid and replace existing costly diesel back-up generators with a lower cost fuel cell-based solution. Use of fuel cells 120 may reduce the high carbon footprint of the current power supplies and generators. The fuel cells 120 may also significantly increase the performance and reliability when used in back-up generation applications, and as compared to diesel back-up generators. The exemplary systems include a fuel cell 120, for example, 68 kW hydrogen-based, water-cooled, fuel cell. For the exemplary systems, a 68 kW fuel cell is coupled with an approximately 62.5 kW worth of data center computing devices. The liquid cooling system 140 matches the loads and required water flow rates for the fuel cell and electronic components that form the electronic components 210 of the data center.

FIG. 4 shows a schematic representation of a data center. A renewable energy source 422, such as solar and/or wind, may be used to directly power the critical power demand of the electronic component in the data center. Renewable energy sources 422 may also be used to power an electrolyzer 424 that converts water to hydrogen. The power grid 428 may also be used to power the electrolyzer 424 when the renewable energy source 422 is not available for electrolysis. Hydrogen produced by the electrolyzer 424 may be stored in a hydrogen storage device 426. The hydrogen produced by the electrolyzer 424 may be stored in the hydrogen storage device 426 and provides a fuel reserve that powers the fuel cell 120. The electrolyzer 424 illustrated in FIG. 4 is powered by renewable energy source 422. Alternatively, a reformer may be used to create hydrogen for the fuel cell 120.

Power may be supplied to the electronic components 210 by a combination of a renewable energy source 422, a power grid 428, and a fuel cell 120. For example, when the renewable energy sources are no longer available or are not producing sufficient energy sources, such as at night when solar energy is used, stored hydrogen will be pumped to fuel cells 120, which will then produce the power to run the critical electronic components 210 of the system 300. When renewable energy sources 422 are no longer available, and the stored hydrogen has been depleted, the electronic components 210 in the data center and the electrolyzer 424 will be powered using a backup method, such as the electric power grid 428. By using fuel cells 120 as a building block, data centers will be able to scale their power capacity at a scale that more closely matches their customers' demand for computing capacity.

Both the data center electronic components 210 and the fuel cells 120 may be liquid-cooled and provide significant sources of waste heat. By using liquid-cooled electronic components, the data center can reject the waste heat from the electronic components to dry coolers, such as evaporative assist air cooler 448, which have extremely low water consumption rates. For example, a data center design may maximize the re-use of waste heat from the data center or maximize the generation of chilled water. FIG. 5 illustrates an example of a data center design that maximizes the generation of chilled water.

FIG. 4 represents an example in which the re-use of the waste heat is maximized. The FIG. 4 example is typically attractive in northern and colder climates. FIG. 5 represents an example in which the maximization of the generation of chilled water is emphasized. FIG. 5 illustrates an example of a data center design that maximizes the generation of chilled water. The FIG. 5 example is typically attractive in southern and warmer climates. Referring back to FIG. 4, the IT water loop and fuel cell water loop are coupled (Loop 1). The temperature entering the fuel cell is lower at 55° C., which in turn limits the amount of chilled water that can be generated, but maximizes the waste heat for re-use. FIG. 5 de-couples the IT water loop (Loop 1) from the fuel cell water loop (Loop 2), which allows the temperature of the water entering the fuel cell to rise from 55° C. to 68° C., thereby allowing for an increase in the amount of chilled water that can be created.

Referring to FIG. 5, the data center may include liquid-cooled racks with critical power demand of the electronic component and data center computing devices. Data center computing devices in the example are hybrid cooled, i.e., high power devices such as central processing units (CPUs), graphical processing units (GPUs), and dual in-line memory modules (DIMMs) are liquid-cooled using water, while the remainder of the servers are air-cooled. In the example, water in the liquid-cooled systems are assumed to capture at least 75% of the rack heat, while the remaining 25% will be rejected directly to the data center air. For the fuel cells 120, at least 90% of the fuel cell heat will be rejected directly to water. For example, the data center electronic components and computing devices will be supplied with water as high as 47° C. The system 300 may use cooler water, but the example is providing a temperature that may be used to supply water created year around using a dry cooler only, such that a chiller is not needed.

For example, the data center electronic components 210 that make up critical power demand of the electronic component may create 750 kW of waste heat (via for example, Loop 1). In Loop 2, the fuel cells 120 may generate 80° C. water at full load and a 424 gpm heated water stream may be used to drive a commercially available adsorption chiller 230 to generate 825 kW of chilled water at a supply temperature of 9° C. The chilled water stream may be used in computer room air handlers (CRAHs), rear door heat exchangers (HXs), or mission critical systems (MCSs) in order to remove the heat from the air that has not been rejected directly to water. Using the waste heat, the adsorption chillers 230 may be able to create a flow of chilled water for the data center.

Any excess power not used to power the critical electronic components 210 can be used in the data center to power the facility. Moreover, additional fuel cells 120 can be installed to provide power for all non-critical loads as well. The example data center design illustrated in FIG. 5 may negate the need for battery-based uninterruptible power supplies (UPSs), diesel generators, and non-stop reliance on the electric power grid 428. The example data center uses the electric power grid 428 for a very small percentage of any given day. In some cases, for example, where renewable energy 422 potential is high, such as solar energy in an area with high levels of solar insolation, the electric power grid may not be needed at all. As a result the data center may have higher reliability and reduced downtime.

FIG. 6 shows an example schematic representing the tight coupling of the electronic components and fuel cell water loop (Loop 1) with the facility water loop (Loop 2). In addition, the cooling system controller 670, is shown tied in to a weather station 672. In one example, the weather station 672 sends the weather forecast that is calling for a cold front to arrive in twenty-four hours. The arrival of the cold front means that facility buildings may need more heat. The cooling system controller 670 may then coordinate with the IT Job Scheduler 674 to schedule the workloads needed to generate the necessary waste heat, at the right time, to heat the facility buildings 676. The fuel cell 120 may also produce the needed power in response to the increased workload at the electronic components 210, but this is not specifically shown in FIG. 6. In addition, the controller will communicate with the liquid-cooled electronic components 210 and fuel cell 120 to ensure that the correct water flow rate at the correct water temperature is delivered for cooling purposes. The liquid-to-liquid heat exchanger 678 as illustrated connects the electronic component and fuel cell water loop (Loop 1) to the facility water loop (Loop 2).

Figure 7:
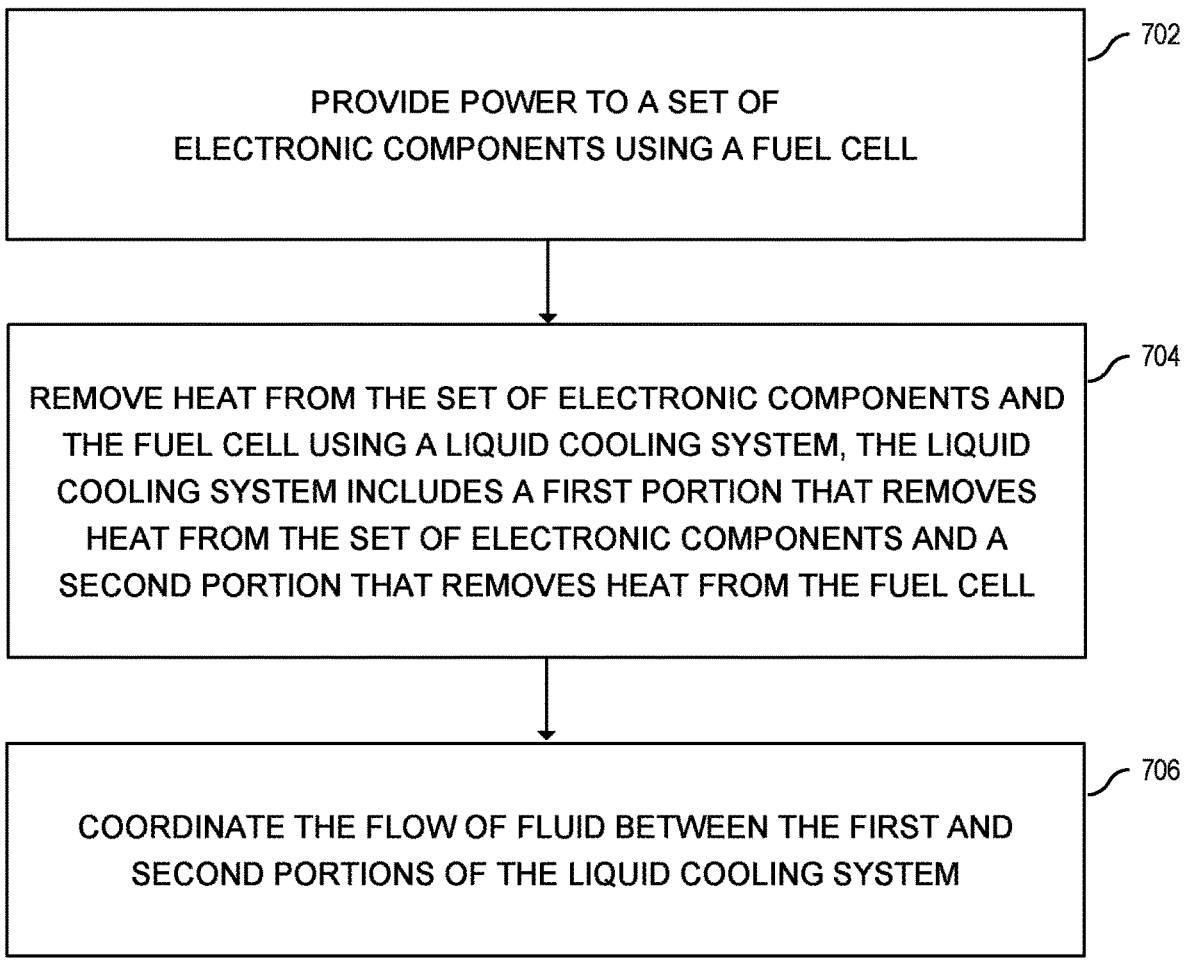
FIG. 7 illustrates a flow chart of a method to manage power and thermal components in a data center according to an example.

FIG. 7 illustrates a flow chart of a method to manage power and thermal components in a data center according to an example. Although execution of process 700 is described below with reference to fuel cell system 100, other suitable systems and/or devices for execution of process 700 may be used. Process 700 may start by providing power to a set of electronic components using a fuel cell (block 702). In an example, the electronic components may be powered directly from a renewable energy source or directly from a fuel cell using hydrogen produced by an electrolyzer. In a further example, the fuel cell may be attached to a reformer powered by natural gas, methane, landfill gas, or other sources of biogas to create hydrogen for the fuel cell.

In addition to using the fuel cell, an additional energy source, such as a first energy source may be used. The first energy source may be, for example, a renewable energy source or an electric power grid. In one example, the electronic components may be powered using a fuel cell when the first energy source is not providing power to the electronic components. In a further example, power may be distributed to the set electronic components using a combination of two or more power sources, such as the first power source, the fuel cell, an electric power grid, and/or a renewable power source.

The process 700 removes heat from the set of electronic components and the fuel cell using a liquid cooling system. The liquid cooling system includes a first set of cooling components that remove heat from the set of electronic components and a second set of cooling components that remove heat from the fuel cell (block 704). The process 700 also coordinates the flow of fluid between the first and second set of cooling components of the liquid cooling system (block 706). For example, the liquid cooling systems may match the loads and required water flow rates for the fuel cell and electronic components that form the electronic components of the data center.

Figure 8:
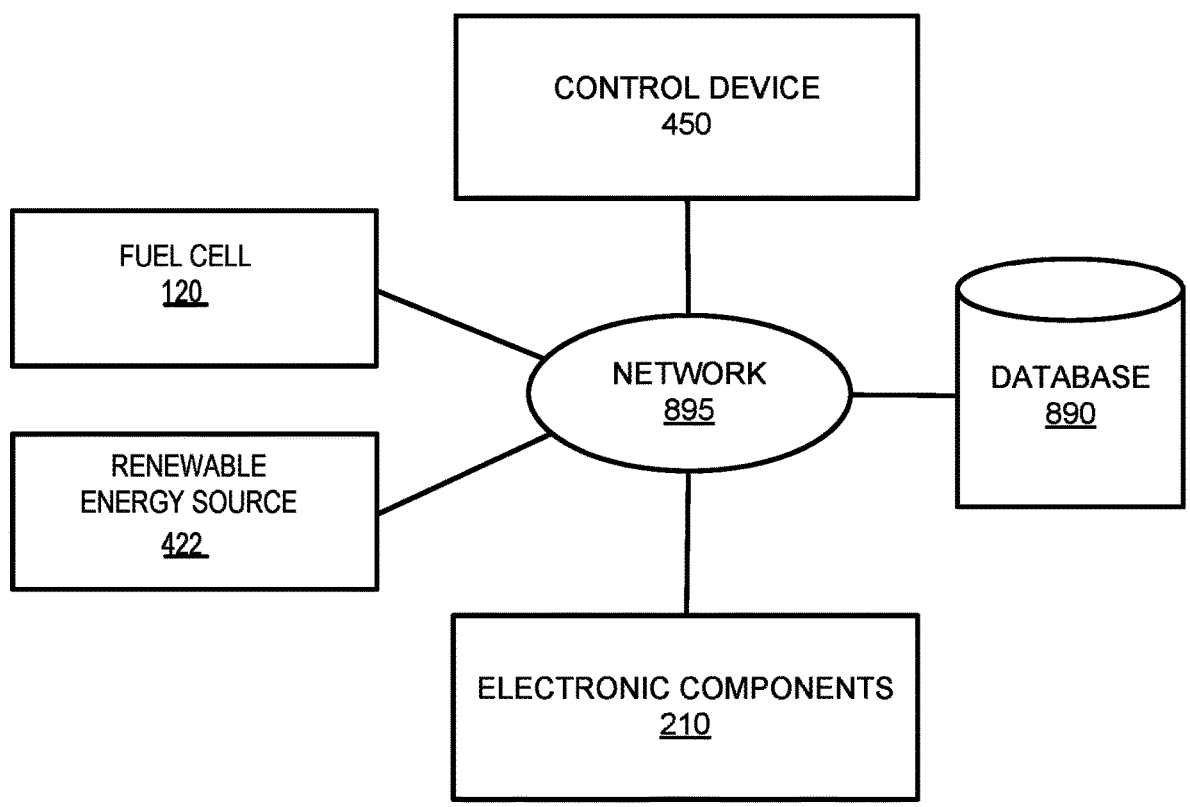
FIG. 8 illustrates a block diagram of a control system according to an example.

FIG. 8 illustrates an overview of a control system according to an example. Control system 800 may be implemented in a number of different configurations without departing from the scope of the examples. In FIG. 8, control system 800 may include a control device 450, a fuel cell 120, a renewable energy source 422, electronic components 210, database 890, and a network 895 for connecting control device 450 with database 890, fuel cell 120, and/or electronic components 210.

Control device 450 may be a computing system that performs various functions consistent with examples to manage power provided to the set of electronic components 210, such as managing the power resources and optimize the use of power resources to reduce the carbon footprint of a data center. For example, control device 450 may be desktop computer, a laptop computer, a tablet computing device, a mobile phone, a server, and/or any other type of computing device. Control device 450 obtains various factors related to the energy sources and electronic components 210. For example, control device 450 may obtain an amount of available power from a renewable energy source 422, a fill level of a hydrogen storage device, and power demand of the electronic component an electrolyzer.

Figure 12:
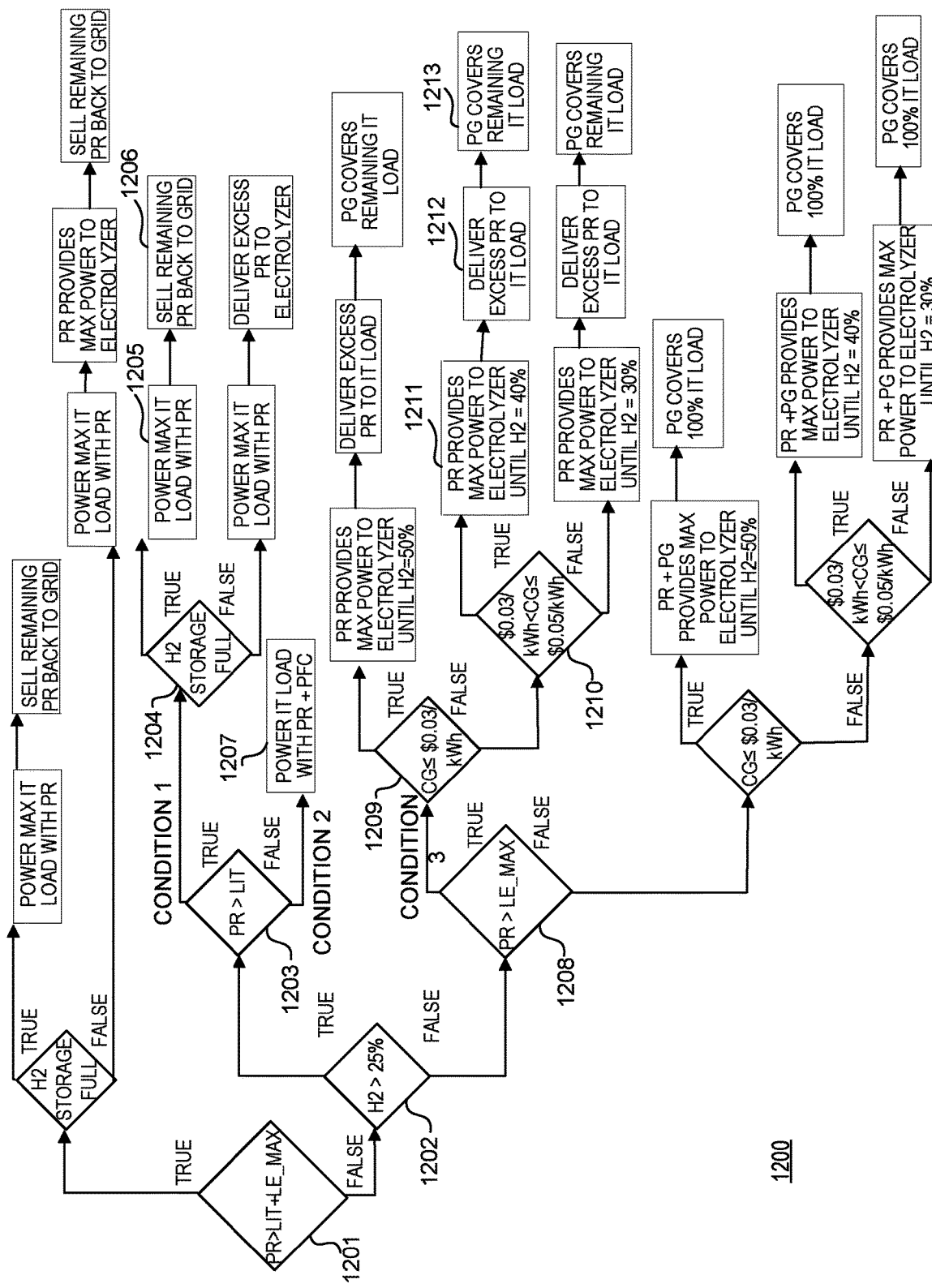
FIG. 12 illustrates flow chart to allocate energy sources to electronic components according to an example.

Control device 450 compares the factors to determine an appropriate use of power resources. For example, control device 450 may compare power demand of the electronic component and the electrolyzer to the amount of available power from a renewable energy source. Control device 450 may also prioritize use of a renewable energy source to power the set of electronic components 210 when the power demand of the electronic component and electrolyzer are less than the amount of available power from the renewable energy source. A set of conditions and a flow as provided by the control device 450 are illustrated in FIG. 12

Control device 450 may also provide power to the set of electronic components using a fuel cell when a set of conditions are met. For example, based on the comparisons, instructions may be sent to select at least one energy source, such as, the fuel cell 120, a renewable energy source 422, and/or a power grid 428. The comparison results and conditions may be stored in database 890. Examples of control device 450 and certain functions that may be performed by control device 450 are described in greater detail below with respect to, for example, FIGS. 8-10.

Referring back to FIG. 4, a schematic representation of the data center is illustrated as an example of a data center that may use control system 800. The electronic components 210 may be powered either directly and solely from any of the power grid 428, a renewable energy source 422, fuel cells 120, natural gas, or biogas with natural gas and biogas not illustrated in FIG. 4. Alternatively, the electronic components 210 can be powered with combinations of two or more of the listed energy sources. The ability to be able to switch between energy sources may be made possible by control system 800. The decision to switch between energy sources may also be driven by a number of factors including the cost of energy from power grid 428, the availability of renewable energy sources 422, the cost of natural gas or biogas, the availability of stored hydrogen, workload priority, electronic component 210 or data center availability. The decision-making may depend on numerous factors, and combinations thereof, based on a robust control methodology.

Database 890 may be any type of storage system configuration that facilitates the storage of data. For example, database 890 may facilitate the locating, accessing, and retrieving of data (e.g., SaaS, SQL, Access, etc. databases, XML files, etc.). Database 890 can be populated by a number of methods. For example, control device 450 may populate database 890 with database entries generated by control device 450, and store the database entries in database 890. As another example, control device 450 may populate database 890 by receiving a set of database entries from another component, a wireless network operator, and/or a user of electronic components 210, fuel cell 120, renewable energy source 422, electrolyzer 424, and/or hydrogen storage device 426, and storing the database entries in database 890. In yet another example, control device 450 may populate database 890 by, for example, obtaining data from an electronic components 210, fuel cell 120, renewable energy source 422, electrolyzer 424, and/or hydrogen storage device 426, such as through use of a monitoring device connected to the control system 800. The database entries can contain a plurality of fields, which may include, for example, information related to capacity, workloads, power demand, and workload schedule. While in the example illustrated in FIG. 8 database 890 is a single component external to components 450, 120, 210, and 422, database 890 may comprise separate databases and/or may be part of devices 450, 210, and/or another device. In some examples, database 890 may be managed by components of device 450 capable of accessing, creating, controlling and/or otherwise managing data remotely through network 895.

Network 895 may be any type of network that facilitates communication between remote components, such as control device 450, fuel cell 120, electronic components 210, database 890, and renewable energy source 422. For example, network 895 may be a local area network (LAN), a wide area network (WAN), a virtual private network, a dedicated intranet, the Internet, and/or a wireless network.

The arrangement illustrated in FIG. 8 is simply an example, and system 800 may be implemented in a number of different configurations. For example, while FIG. 8, shows one control device 450, renewable energy source 422, fuel cell 120, electronic components 210, database 890, and network 895, system 800 may include any number of components 450, 120, 422, 210, and 890, as well as other components not depicted in FIG. 8. System 800 may also omit any of components 450, 120, 422, 210, and 890. For example, control device 450, renewable energy source 422, fuel cell 120, electronic components 210, and/or database 890, may be directly connected instead of being connected via network 895. As another example, control device 450, renewable energy source 422, fuel cell 120, electronic components 210, and/or database 890, may be combined to be a single device.

Referring to FIG. 8, a control device 450 is illustrated. In certain aspects, control device 450 may correspond to multiple control device 450 of FIG. 8. Control device 450 may be implemented in various ways. For example, control device 450 may be a special purpose computer, a server, a mainframe computer, a computing device executing instructions that receive and process information and provide responses, and/or any other type of computing device.

Figure 9:
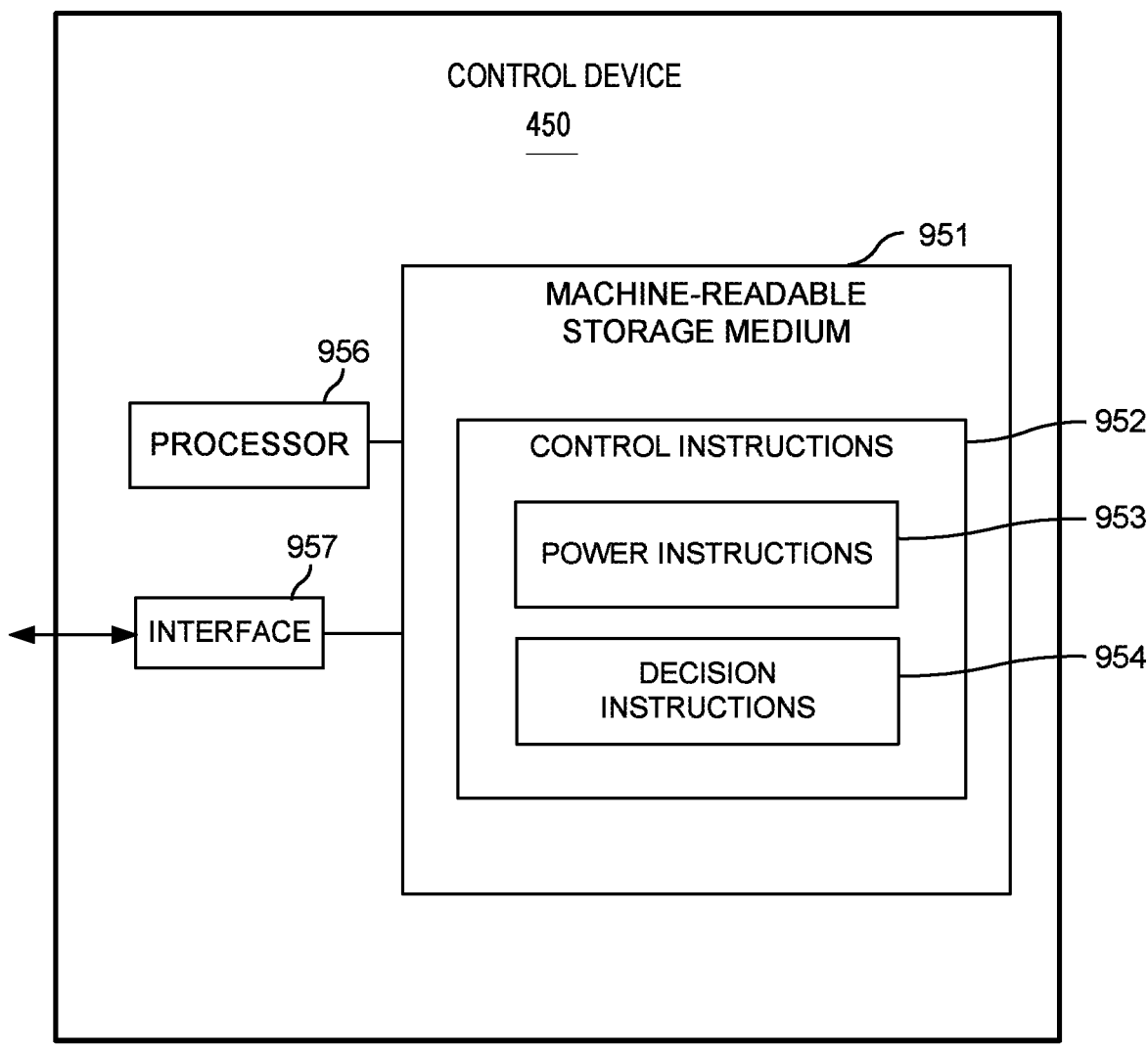
FIGS. 9-10 illustrate control devices to control energy sources for a set of electronic components according to examples.
Figure 10:
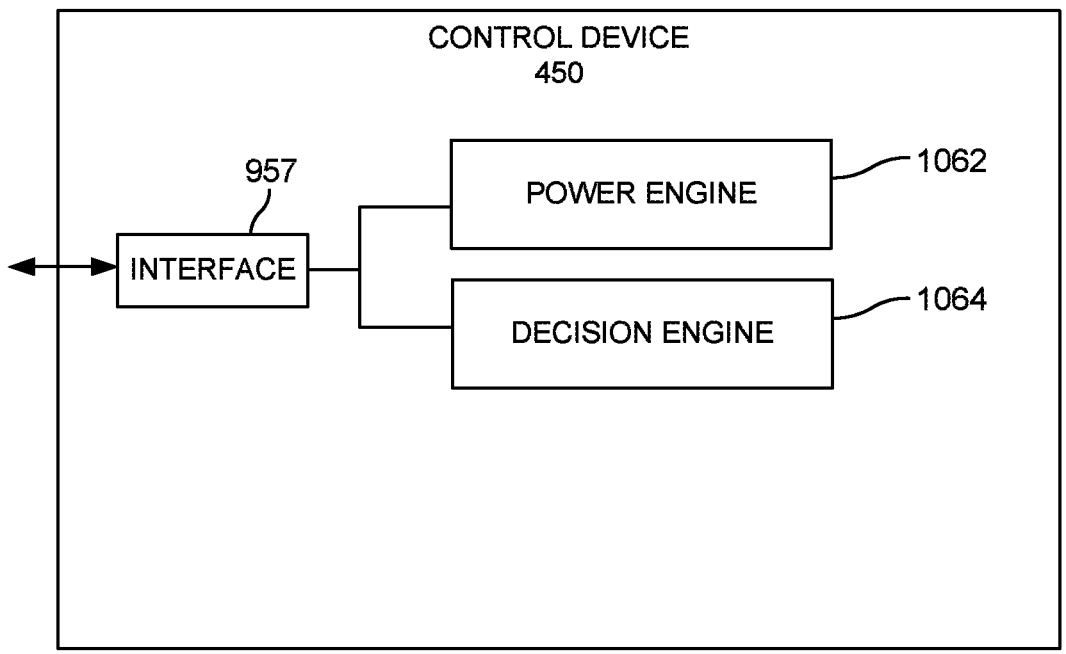

FIGS. 9-10 illustrate control devices 450 to control energy sources for a set of electronic components according to examples. Control device 450 may include a machine-readable storage medium 951, a processor 956, and an interface 957. Processor 956 may be at least one processing unit (CPU), microprocessor, and/or another hardware device to execute instructions to perform operations. For example, processor 956 may fetch, decode, and execute control instructions 952 (e.g., instructions 953 and/or 954) stored in machine-readable storage medium 951 to perform operations related to examples provided herein.

Interface 957 may be any device that facilitates the transfer of information between control device 450 and other components, such as database 890. In some examples, interface 957 may include a network interface device that allows control device 450 to receive and send data to and from network 895. For example, interface 957 may retrieve and process data related to controlling energy sources in a data center from database 890 via network 895.

Machine-readable storage medium 951 may be any electronic, magnetic, optical, or other physical storage device that stores executable instructions. Thus, machine-readable storage medium 951 may be, for example, memory, a storage drive, an optical disc, and/or the like. In some implementations, machine-readable storage medium 951 may be non-transitory, such as a non-transitory computer-readable storage medium, where the term "non-transitory" does not encompass transitory propagating signals. Machine-readable storage medium 951 may be encoded with instructions that, when executed by processor 956, perform operations consistent with the examples herein. For example, machine-readable storage medium 951 may include instructions that perform operations that efficiently control power and thermal components in a data center. In the example illustrated in FIG. 9, the machine-readable storage medium 951 may be a memory resource that stores instructions that when executed cause a processing resource, such as processor 956 to implement a system to control energy sources in a data center. The instructions include control instructions 952, such as power instructions 953 and decision instructions 954.

Power instructions 953 may function to provide power to the set of electronic components using at least one of a first energy source and a fuel cell both connected to the set of electronic components. For example, the first energy source may include a renewable energy source. When power instructions 953 are executed by processor 956, power instructions 953 may cause processor 956 of control device 450, and/or another processor to prioritize the renewable energy source to provide power to the set of electronic components. Power instructions 953 may use the fuel cell to provide power to the set of electronic components when the available power of the first energy source falls below an available power threshold level. For example, the power instructions 953 may power the set of electronic components by a combination of the fuel cell and renewable energy source when power demand of the electronic component is more than the amount of available power from the renewable energy source. The power instructions 953 may also use a combination of the renewable energy source, the fuel cell, and a power grid based on the set of conditions. For example the power instructions 953 may instruct the first energy source connected to an electrolyzer to provide power to the electrolyzer when hydrogen production is required. The power instructions 953 may also instruct a renewable energy source to provide power to at least one of the electronic components and an electrolyzer based on instructions from decision instructions 954. Examples of power allocations are described in further detail below with respect to, for example, FIGS. 10-12.

Decision instructions 954 may function to manage and prioritize provisioning of power to the set of electronic components. For example, when decision instructions 954 are executed by processor 956, decision instructions 954 may provide instructions for the fuel cell to power to the set of electronic components when the power demand of the electronic component is greater than an amount of available power from the first energy source. The decision instructions 954 may also obtain power demand of the set of electronic components, a power demand of an electrolyzer, an amount of available power from a renewable energy source, a cost of energy from a power grid, and/or a fill level of a hydrogen storage device to determine instructions for prioritizing and allocating power from available energy sources. For example, decision instructions 954 may compare a power demand of the electronic component and an electrolyzer to the amount of available power from a renewable energy source to determine the energy source and determine when to run the electrolyzer, such that the electrolyzer is instructed to produce hydrogen until a threshold hydrogen level is met, i.e., a fill level threshold. The instructions may stop power delivery to the electrolyzer when the hydrogen level reaches a threshold. In a further example, decision instructions 954 may determine when a fill level of a hydrogen storage device is within a full range, excess amounts of available power from the renewable energy source are sold. For example, an excess amount of available power from the renewable energy source is sold back to a power grid when a combination of the power demand of the set of electronic components and the power demand of the electrolyzer is less than the amount of available power from the renewable energy source and a fill level of a hydrogen storage device is within a full range.

In contrast, when a fill level of a hydrogen storage device is less than a threshold then available renewable power is sent to the electrolyzer and the electrolyzer is set to produce hydrogen. Examples of the decision instructions 954 are described in further detail below with respect to, for example, FIG. 12.

Referring to FIG. 10, control device 450 is illustrated to include a power engine 1062 and a decision engine 1064. In certain aspects, control device 450 may correspond to control device 450 of FIGS. 7-8. Control device 450 may be implemented in various ways. For example, control device 450 may be a computing system and/or any other suitable component or collection of components that control power and thermal components in a data center.

Interface 957 may be any device that facilitates the transfer of information between control device 450 and external components. In some examples, interface 957 may include a network interface device that allows control device 450 to receive and send data to and from a network. For example, interface 957 may retrieve and process data related to control of power and thermal components in a data center from database 890.

Engines 1062 and 1064 may be electronic circuitry for implementing functionality consistent with disclosed examples. For example, engines 1062 and 1064 may represent combinations of hardware devices and instructions to implement functionality consistent with disclosed implementations. The instructions for the engines may be processor-executable instructions stored on a non-transitory machine-readable storage medium and the hardware for the engines may include a processor to execute those instructions. In some examples, the functionality of engines 1062 and 1064 may correspond to operations performed by control device 450 of FIGS. 1-2, such as operations performed when control instructions 952 are executed by processor 956. In FIG. 10, power engine 1062 may represent a combination of hardware and instructions that performs operations similar to those performed when processor 956 executes power instructions 953. Similarly, decision engine 1064 may represent a combination of hardware and instructions that perform operations similar to those performed when processor 956 executes decision instructions 954.

Figure 11:
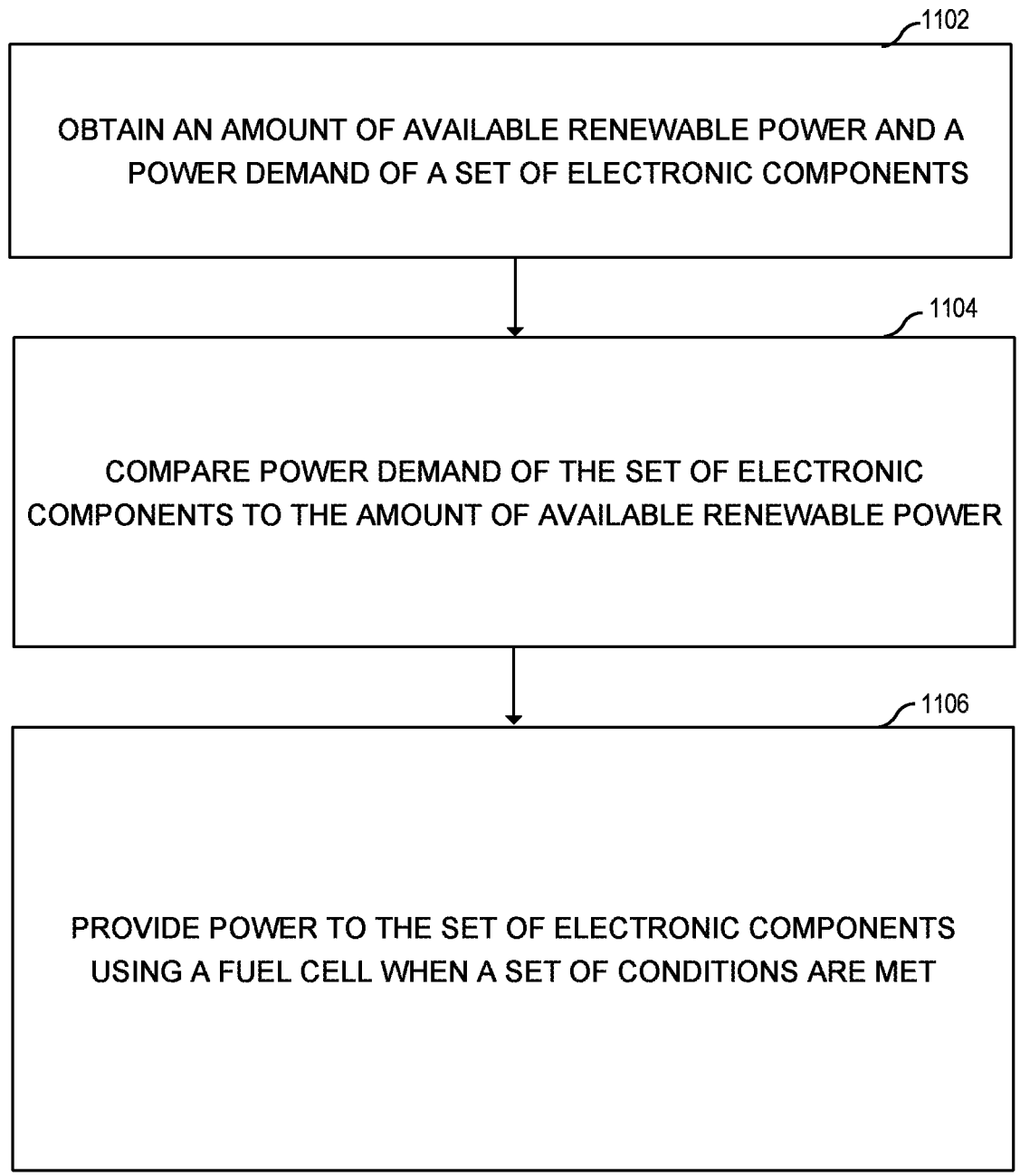
FIG. 11 illustrates a flow chart of a method to control allocation of energy sources according to an example.

FIG. 11 illustrates a flow chart of a method to control allocation of energy sources according to an example. Although execution of process 1100 is described below with reference to control system 800, other suitable systems and/or devices for execution of process 1100 may be used. For example, processes described below as being performed by control system 800 may be performed by control device 450 and/or any other suitable device or system. Process 1100 may be implemented in the form of executable instructions stored on a storage device, such as a machine-readable storage medium, and/or in the form of electronic circuitry.

Process 1100 may start by obtaining an amount of available renewable power and a power demand of the set of electronic components (block 1102). For example, control device 450 may detect the amount of available renewable power in the system 800 and power demand of the electronic component for critical electronic components. The information regarding the available renewable power and power demand of the electronic component may be stored in a storage device, such as database 890, and control device 450 may query database 890 to obtain the information regarding the available renewable power and power demand of the electronic component.

Process 1100 may also include comparing a power demand of the set of electronic components to the amount of available renewable power (block 1104). The results of comparisons may be stored in a storage device, such as database 890, and control device 450 may query database 890 to obtain the results.

Process 1100 may also include providing power to the set of electronic components using a fuel cell when a set of conditions are met (block 1106). The energy source allocation may be based at least partially on the comparison of the power demand of the electronic component to the amount of an available renewable power. Process 1100 may also use control device 450 to determine prioritized power allocation based on the assessment of additional external variables, such as hydrogen storage level, cost of energy from a power grid, power demand of the electronic component, and available renewable power. For example, control device 450 may use decision instructions 954 to provide power to the set of electronic components using a fuel cell when a set of conditions, such as a first set of conditions, are met. Decision instructions 954 may also be used to prioritize a renewable energy source to provide power to the set of electronic components and/or the electrolyzer based on a set of conditions, such as a second set of conditions. Decision instructions 954 may also be used to provide power to the set of electronic components using a combination of the renewable energy source, power grid, and/or the fuel cell when the set of conditions are met. Examples of energy source allocations are illustrated in FIG. 12. Energy source allocation data may be stored in a storage device, such as database 890, and control device 450 may query database 890 to obtain energy source allocations.

In some examples, control device 450 of system 800 may obtain a power demand of the electrolyzer and a fill level of a hydrogen storage device. The decision instructions 954 may compare the power demand of the electronic component and electrolyzer to a threshold, such as the amount of available renewable power. The decision instructions 954 may prioritize the renewable energy source to provide power to the set of electronic components to use when the power demand of the electronic component and electrolyzer are less than the amount of available renewable power. The decision instructions 954 may also cause processor 956 of control device 450 and/or another processor to stop the electrolyzer when the hydrogen level reaches a threshold.

FIG. 12 illustrates flow chart 1200 to allocate energy sources to electronic components according to an example. FIG. 12 illustrates control diagnostics to allocate energy sources using multiple scenarios in the decision-making process. The following three key factors are used to drive control: 1) available renewable power in kW, PR, 2) Hydrogen storage device fill level based on percentage, H2, and 3) real-time electricity cost from the grid in $/kWh, CG. It should be noted that all values selected as decision points in control were chosen arbitrarily to demonstrate an example of control device 450. Additional variables used in the subsequent description are listed below:

LE_MAX=absolute maximum power demand of the electrolyzer (assumed to be 120 kW);

LIT=power demand of the electronic component (assumed to be 500 kW);

PR_IT=power delivered from renewable energy sources to electronic components;

PG_IT=power delivered from the grid to electronic components;

PFC=power delivered from the fuel cell to the electronic components;

PSELL=power sold back to grid;

LE=electrolyzer load; and

PG=power available from the grid.

Additional factors, such as natural or biogas, workload priority, electronic component availability, and data center availability are not illustrated but may be used in a manner similar or in addition to those illustrated herein.

Several conditions are illustrated in FIG. 12. Three conditions are highlighted to demonstrate the application of the flow chart. Condition 1: PR>500 kW, H2=100%; Condition 2: PR<500 kW, H2>25%; and Condition 3: 120 kW<PR< (500 kW+120 kW), H2<25%, $0.03/kWh<CG≤$0.05/kWh.

Referring to FIG. 12, Condition 1 illustrates when the renewable power PR is greater than the selected power demand of the electronic component of 500 kW. Condition 1 starts at the comparison of a renewable power (PR) to power demand of the electronic component and electrolyzer, PR to LIT+LE_MAX (block 1201) as the initial decision for moving forward in the process. The ensuing decision-making is described as follows. The hydrogen, H2, storage level is assessed and determined to exceed the minimum hydrogen availability threshold of, for example, H2 greater than 25% (block 1202). Available power from renewables exceeds the demand of the electronic component (PR>LIT) (block 1203). Neither grid support nor fuel cell support is required to power the IT equipment (PG=0 W, PFC=0 W). The hydrogen storage device is full (H2=100%) (block 1204). Hydrogen production is not needed so no power will be delivered to the electrolyzer. Electronic components are considered first priority for available renewable power, and 100% of power demand of the electronic component will be powered by renewables (PR_IT=LIT) (block 1205). Any excess renewable power will be sold back to the grid at market price (PSELL=PR−LIT) (block 1206).

Condition 2 highlights the renewable power PR as less than the selected power demand of the electronic component of 500 kW, as determined in block 1201. The H2 level is determined to be greater than 25% (block 1202). The process starts at the comparison of a renewable power (PR) to power demand of the electronic component and electrolyzer, PR to LIT+LE_MAX (block 1201) as the initial decision moving forward in the process. The ensuing decision-making is described as follows. The hydrogen storage device level is assessed and determined to exceed the minimum hydrogen availability threshold of 25% (H2>25%) (block 1202). Available power from renewables does not meet the demand of the power demand of the electronic component (PR<LIT) (block 1203). Hydrogen production is not required, so no power will be delivered to the electrolyzer (H2>25%). Electronic components shall be considered first priority for all available renewable power, although this will only partially satisfy demand from the power demand of the electronic component and 100% of available renewable power will be delivered to the electronic component (PR_IT=PR). Fuel cell may provide the electronic component with any additional power not satisfied by a renewable energy source (PFC=LIT−PR_IT) (block 1207). No grid support is required to power the IT equipment (PG=0 W).

Condition 3 starts at the comparison of a renewable power (PR) to power demand of the electronic component and electrolyzer, PR to LIT+LE_MAX (block 1201) as the initial decision for moving forward in the process. The ensuing decision-making is described as follows. The hydrogen storage device level assessed and determined to have dropped to or below the minimum hydrogen availability threshold of 25% (H2≤25%) (block 1202); and the process determines that hydrogen production is now a requirement. Available power from renewables exceeds the peak demand of the electrolyzer (120 kW), but cannot meet the demand of both the electrolyzer and the power demand of the electronic component (LE_MAX<PR<LE_MAX+LIT) (block 1208). To determine energy source selection for the electrolyzer and the power demand of the electronic component, the real-time cost of energy from the grid is assessed. In the example, cost of energy from the power grid is higher than the minimum threshold of $0.03/kWh (block 1209), but lower than or equal to the maximum threshold of $0.05/k/Wh (block 1210). As a result, electrolyzer load is considered first priority for available renewable power and 100% of the power demand of the electrolyzer (LE_MAX) will be satisfied by renewable energy source (block 1211). Electronic components shall be considered second priority load for any remaining available renewable power (block 1212); although, this will only partially satisfy demand from the electronic component (PR_IT=PR−LE_MAX). The power grid shall provide the electronic component with any additional power not satisfied by renewables (PG_IT=LIT−(PR−LE_MAX)) (block 1213). Only after hydrogen storage level is increased to 40% capacity (block 1211) will the electronic components revert back to first priority for available renewable power. The hydrogen storage level of 40% was chosen based on real-time cost of energy from the grid, which in this case was $0.03/kWh<CG≤$0.05/kWh (block 1210). If energy cost is higher (>$0.05/kWh), hydrogen will only be increased to 30%. If energy cost is lower (≤$0.03/kWh), the hydrogen will be increased further to 50% (block 1209). This is to reduce the amount of time operating from the electric power grid during peak hours when energy is more expensive, thus reducing operating costs.

The process in FIG. 12, minimizes total cost of operation by continuously comparing the cost of energy from grid power to the cost of energy generated using renewables, natural gas, biogas, etc. Note that power from a source other than a power grid can either be delivered directly to the electronic components, or it can be used to generate hydrogen. The process also provides a robust control scheme to allow for efficient switching between the various sources of power. Studying the energy costs and the impact on the system, control device 450 may be used to schedule workload based upon power pricing and availability or renewable energy, and allow for determining the lowest cost of computing. For example, critical workload can be scheduled as needed, while non-critical workload may be shifted to the time period when the cost to power the data center is lowest.

FIGS. 11-12 are flow diagrams 1100 illustrating methods to control allocation of energy sources according to an example. Although execution of process 1100 is described below with reference to system 800, other suitable systems and/or devices for execution of process 1100 may be used. For example, processes described below as being performed by system 800 may be performed by control device 450 and/or any other suitable device or system. Process 1100 may be implemented in the form of executable instructions stored on a storage device, such as a machine-readable storage medium, and/or in the form of electronic circuitry.

The present disclosure has been described using non-limiting detailed descriptions of examples thereof and is not intended to limit the scope of the present disclosure. It should be understood that features and/or operations described with respect to one example may be used with other examples and that not all examples of the present disclosure have all of the features and/or operations illustrated in a particular figure or described with respect to one of the examples. Variations of examples described may occur to persons of the art. Furthermore, the terms "comprise," "include," "have" and their conjugates, shall mean, when used in the present disclosure and/or claims, "including but not necessarily limited to."

It is noted that some of the above described examples may include structure, acts or details of structures and acts that may not be essential to the present disclosure and are intended to be exemplary. Structure and acts described herein are replaceable by equivalents, which perform the same function, even if the structure or acts are different, as known in the art. Therefore, the scope of the present disclosure is limited only by the elements and limitations as used in the claims.

What is claimed is:

1. A system to manage power and thermal components comprising:
   a set of electronic components;
   a fuel cell to provide power to the set of electronic components;
   a data center cooling infrastructure that coordinates the flow of fluid;
   a first liquid cooling system to remove heat from the set of electronic components by flowing a first liquid across the electronic components; and
   a second liquid cooling system to remove heat from the fuel cell by flowing a second liquid across the fuel cell, the first liquid cooling system and the second liquid cooling system coupled to the data center cooling infrastructure to coordinate the flow of fluid between the first and the second liquid cooling systems.

2. The system of claim 1, further comprising a renewable energy source to also supply power to the set of electronic components.

3. The system of claim 2, wherein, the fuel cell supplies power to the set of electronic components when the renewable energy source not supplying power to the set of electronic components.

4. The system of claim 2, wherein power is supplied to the set of electronic components by a power grid when the renewable energy source and the fuel cell are not supplying power.

5. The system of claim 1, further comprising an electrolyzer that converts water to hydrogen.

6. The system of claim 5, further comprising a hydrogen storage device to store hydrogen produced by the electrolyzer.

7. The system of claim 5, wherein hydrogen produced by the electrolyzer powers the fuel cell.

8. The system of claim 1, wherein the data center cooling infrastructure coordinates the flow of fluid between the first and the second liquid cooling systems by matching water flow rates to the fuel cell and the electronic components based on at least a heat load of the electronic components.

9. The system of claim 1, wherein the data center cooling infrastructure coordinates the flow of fluid between the first and the second liquid cooling systems by matching water flow rates to the fuel cell and the electronic components based on respective heat loads of the fuel cell and the electronic components.

10. The system of claim 1, wherein the first liquid and the second liquid are different liquids flowing through two different fluid circulation loops.

11. The system of claim 1, wherein the first liquid and the second liquid are the same liquid flowing through one fluid circulation loop.

12. The system of claim 1, further comprising an adsorption chiller coupled to the fuel cell, the adsorption chiller to convert waste heat into chilled water.

13. A method to manage power and thermal components in comprising:
   providing power to a set of electronic components using a fuel cell;
   removing heat from the set of electronic components and the fuel cell using a liquid cooling system, the liquid cooling system includes a first set of cooling components that remove heat from the set of electronic components by flowing a first liquid across the electronic components and a second set of cooling components that remove heat from the fuel cell by flowing a second liquid across the fuel cell; and
   coordinating the flow of fluid between the first and second set of cooling components of the liquid cooling system.

14. The method of claim 13, further comprising providing power to the set of electronic components using a first energy source.

15. The method of claim 14, further comprising distributing power to the set electronic components using a combination of the first energy source and the fuel cell.

16. The method of claim 14, further comprising powering the computing system using a fuel cell when the first energy source is not providing power to the set of electronic components.

17. The method of claim 13, further comprising powering the fuel cell using hydrogen produced by an electrolyzer connected to the fuel cell.

* * * * *